United States Patent
Grant et al.

(10) Patent No.: US 8,971,073 B2
(45) Date of Patent: Mar. 3, 2015

(54) SYSTEM AND METHOD FOR PROVIDING A HIGH EFFICIENCY BYPASS CIRCUIT FOR MULTI-STAGE DC-DC CONVERTERS USED IN BATTERY POWERED SYSTEMS

(75) Inventors: Kristy M. Grant, Ellicott City, MD (US); Edwin G. Cox, Jamestown, NC (US); Reba Cox, legal representative, Jamestown, NC (US); James W. Blair, Ellicott City, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 367 days.

(21) Appl. No.: 13/636,800

(22) PCT Filed: Mar. 22, 2011

(86) PCT No.: PCT/US2011/000525
§ 371 (c)(1),
(2), (4) Date: Apr. 8, 2013

(87) PCT Pub. No.: WO2011/119219
PCT Pub. Date: Sep. 29, 2011

(65) Prior Publication Data
US 2013/0234686 A1  Sep. 12, 2013

Related U.S. Application Data

(60) Provisional application No. 61/316,673, filed on Mar. 23, 2010.

(51) Int. Cl.
*H02M 3/28* (2006.01)
*G05F 1/56* (2006.01)
(Continued)

(52) U.S. Cl.
CPC ............... *G05F 1/56* (2013.01); *H02J 7/0065* (2013.01); *H02M 3/28* (2013.01); *H02M 2001/0022* (2013.01); *H02M 2001/007* (2013.01)
USPC .......................................................... 363/65

(58) Field of Classification Search
CPC ....... H02M 3/02; H02M 3/145; H02M 3/155; H02M 3/156; H02M 3/22; H02M 3/325; H02M 3/335; H02M 3/33507
USPC .............. 363/15, 21.04, 50, 65; 323/266, 268
See application file for complete search history.

(56) References Cited

U.S. PATENT DOCUMENTS 4,999,568 A * 3/1991 Gulczynski .................... 323/351
5,404,092 A * 4/1995 Gegner ........................ 323/207
(Continued)

FOREIGN PATENT DOCUMENTS

GB          2501107     * 10/2013    ............... H02H 3/20
WO    WO2011/119219 A3    10/2011

*Primary Examiner* — Adolf Berhane
(74) *Attorney, Agent, or Firm* — Andrews Kurth LLP; Sean S. Wooden

(57) ABSTRACT

A system and method are disclosed for providing a high efficiency bypass circuit for multi-stage direct current to direct current (DC-DC) converters used in battery powered systems. When the system is operating in a battery mode, the vehicle power source is unplugged from the power supply input connector and the external battery is connected in its place. The system uses a relay to bypass the flyback converter so as to connect the boost converter output directly to the output terminals. The system uses a single control signal to: 1) energize the relay connecting the boost converter output directly to the output terminals, 2) adjust the boost converter circuit to cause the boost converter to deliver a voltage equal to what the flyback converter would have delivered, and 3) disable the flyback converter.

20 Claims, 9 Drawing Sheets

(51) Int. Cl.
*H02J 7/00* (2006.01)
*H02M 1/00* (2006.01)

(56) References Cited

U.S. PATENT DOCUMENTS

| | | | |
|---|---|---|---|
| 6,134,124 A * | 10/2000 | Jungreis et al. | 363/34 |
| 6,356,467 B1 * | 3/2002 | Belehradek, Jr. | 363/24 |
| 6,373,725 B1 * | 4/2002 | Chang et al. | 363/21.01 |
| 6,717,388 B2 | 4/2004 | Smidt et al. | |
| 6,952,355 B2 * | 10/2005 | Riggio et al. | 363/21.15 |
| 7,218,081 B2 | 5/2007 | Jang et al. | |
| 8,115,457 B2 * | 2/2012 | Balakrishnan et al. | 320/166 |
| 8,134,848 B2 * | 3/2012 | Whittam et al. | 363/84 |
| 8,369,111 B2 * | 2/2013 | Balakrishnan et al. | 363/21.15 |
| 8,461,813 B2 * | 6/2013 | Chapman | 323/259 |
| 2005/0127854 A1 | 6/2005 | Charles et al. | |
| 2008/0123374 A1 | 5/2008 | Vinciarelli | |

\* cited by examiner

US 8,971,073 B2

SYSTEM AND METHOD FOR PROVIDING A HIGH EFFICIENCY BYPASS CIRCUIT FOR MULTI-STAGE DC-DC CONVERTERS USED IN BATTERY POWERED SYSTEMS

RELATED APPLICATIONS

This application is a National Phase application of PCT Application Serial No. PCT/US2011/000525, filed Mar. 22, 2011, entitled "A SYSTEM AND METHOD FOR PROVIDING A HIGH EFFICIENCY BYPASS CIRCUIT FOR MULTI-STAGE DC-DC CONVERTERS USED IN BATTERY POWERED SYSTEMS", which claims priority of U.S. Provisional Application Ser. No. 61/316,673, entitled the same and filed Mar. 23, 2010, both of which are hereby incorporated by reference.

BACKGROUND

A power supply may function with a wide variety of power sources, including batteries and vehicle power. During transient conditions the input power may rise above or fall below normal operating ranges, and a power supply should be able to withstand these changes. For example, vehicle power has a wide input voltage operating range (e.g., from 6V-32V), whereas battery power has a narrow input voltage operating window (e.g., 10V-16V). Direct current to direct current (DC-DC) converters may be used to manage the wide input voltage operating ranges. DC-DC converters employ a number of switch topologies, which may include a boost converter or a flyback converter. The boost converter may be used to convert a low input voltage supplied by, for example, a battery, to an optimal voltage level greater than the input level. The flyback converter may be used in conjunction with the boost converter to convert a high input voltage supplied by, for example, a vehicle, to an optimal voltage level smaller than the input level. The conversions may yield an efficiency of approximately 70%. The flyback converter may be needed to manage the vehicle power's wide input voltage range and to provide DC isolation between the vehicular source and the end user power converter load, but may not be needed to manage the battery power's input voltage ranges.

SUMMARY

An embodiment of a system provides a high efficiency bypass circuit for multi-stage direct current to direct current (DC-DC) converters. The DC-DC converters include a boost converter and a flyback converter. An embodiment of the system includes a control circuit comprising a relay that connects an output of the boost converter directly to an output terminal of the DC-DC converters. The control circuit provides a single control signal to adjust an output voltage of the boost converter to be the same as an output voltage of the flyback converter and to disable the flyback converter.

An embodiment of a method provides a high efficiency bypass circuit for multi-stage direct current to direct current (DC-DC) converters. The DC-DC converters include a boost converter and a flyback converter. An embodiment of the method includes connecting a battery power input to a power supply board using one or more pins, connecting the battery power input to a boost converter control circuit using an additional pin, providing a single control signal to energize a relay to connect an output of the boost converter directly to an output terminal of the DC-DC converters, detecting an existence of the single control signal and the relay, adjusting an output voltage of the boost converter to be the same as an output voltage of the flyback converter, and disabling the flyback converter.

DESCRIPTION OF THE DRAWINGS

The detailed description will refer to the following drawings, wherein like numerals refer to like elements, and wherein.

DETAILED DESCRIPTION

Figure 1:
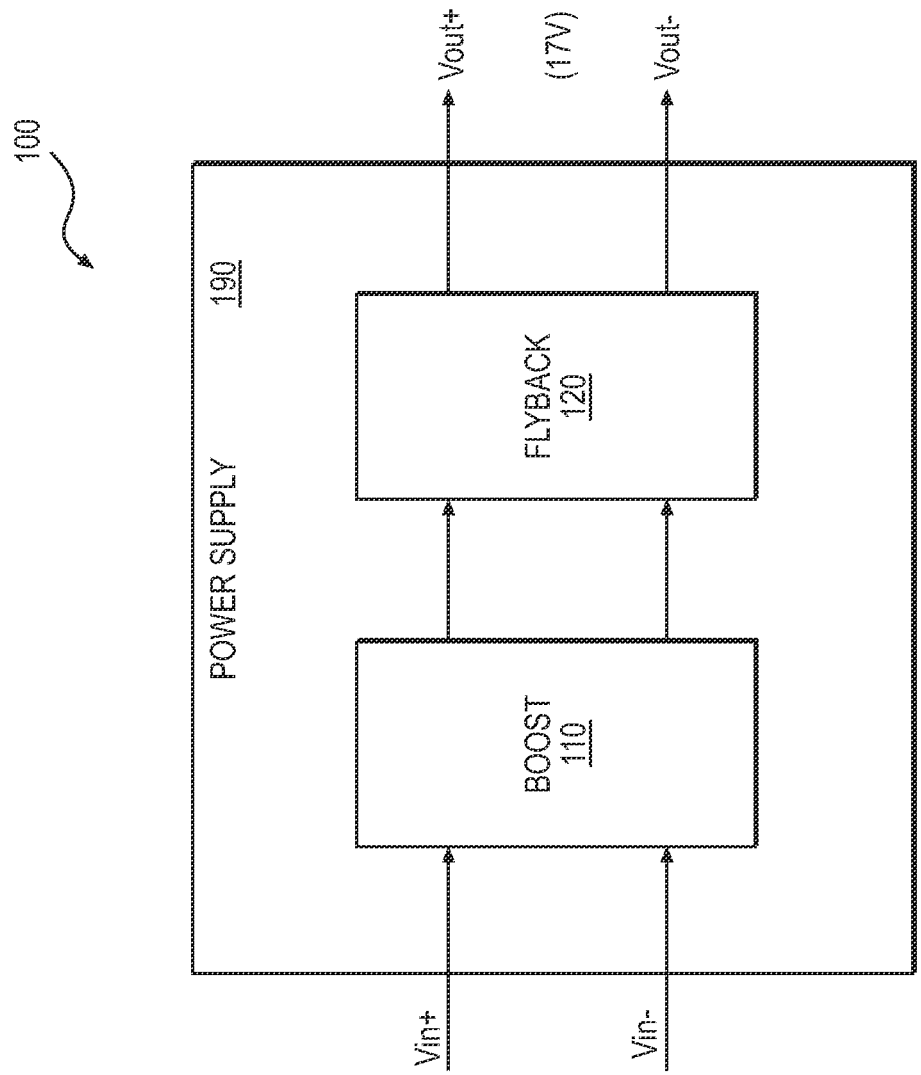
FIG. 1 illustrates a direct current to direct current (DC-DC) converter system for a vehicle.
Figure 1:
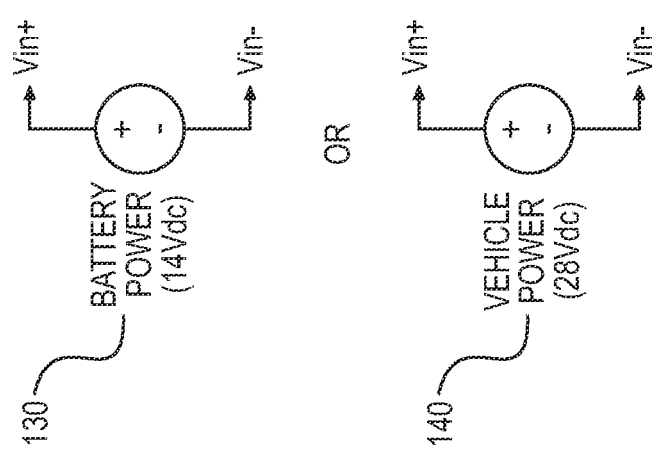

FIG. 1 illustrates a conventional direct current to direct current (DC-DC) converter system 100 for a vehicle. As noted above, a power supply 190 may function with either battery power 130 or vehicle power 140. During transient conditions, the vehicle power 140 has a wide input voltage operating range (e.g., 6V-32V), whereas the battery power 130 has a narrow input voltage operating window (e.g., 10V-16V). The input voltage provided from the vehicle power 140 is typically 28V, whereas the input voltage provided form the battery power 130 is typically 14V.

Two DC-DC converters may be used to manage the input voltage operating ranges, i.e., a boost converter 110 and a flyback converter 120. The boost converter 110 may be used to convert a low input voltage supplied by, for example, either a vehicle power source or a battery power source, to an optimal voltage level greater than the input level. The flyback converter 120 may be used to convert a high input voltage supplied by, for example, a vehicle power source, to an optimal voltage level smaller than the input level. The optimal voltage level depends on the usage. When the input source is the vehicular power the boost converter output is a larger value, such as 25V. The flyback converter 120 provides DC isolation and regulates the output voltage to 17V. When the input source is battery power, the boost converter 110 is set to, for example, 17V and a relay is used to bypass the flyback converter 120, presenting this 17V to the output. The conversions chained together may yield an efficiency of approximately 70%.

The boost converter 110 is typically operational at voltages below 25V. Above 25V, the boost converter 110 may be disabled, leaving the flyback converter 120 as the only converter that runs. Across the entire 6V-32V operational range, the electrical isolation between the vehicle input power and the 20 W of output power may be provided using the flyback converter 120. The efficiency for the power supply 190 is the product of the boost converter efficiency and the flyback converter efficiency. The efficiency for a normal 25V-32V operation may be approximately 80%. Between 10V to 18V input voltage, the efficiency may be in the range of 75% to 78%. Below 10V input voltage, the efficiency may drop to about 65%.

The vehicle power 140 may be replaced with the battery power 130, such as a Zinc-Air battery power. The Zinc-Air battery typically has a nominal input voltage of 14V. Over the charge cycle, the battery power 130 may operate anywhere from 10V-16V. While the flyback converter 120 may be needed to manage the vehicle power's wide input voltage range, the flyback converter 120 may not be needed to manage the battery power's input voltage ranges of, for example, 10V-16V. In other words, only the boost converter 110 may be needed to operate over this input voltage range. Battery powered systems typically require high efficiency. The two stage converter design shown in FIG. 1 and used for the vehicle power 140 does not provide high efficiency in the 10V-16V input voltage range. In addition, the battery power 130 is already electrically isolated from the vehicle, thus the flyback converter's additional feature of electrical isolation, i.e., transformer isolation, is not needed in the battery powered systems.

FIGS. 2-6 illustrate embodiments of a system 200 for providing a high efficiency bypass circuit for multi-stage DC-DC converters used in battery powered systems.

When the system 200 is operating in the battery mode, the vehicle power source is unplugged from the power supply input connector and the external battery, such as a Zinc-Air battery, is connected in its place. The system 200 uses a relay to bypass the flyback converter so as to connect the boost converter output directly to the output terminals. The system 200 uses a single control signal, referred to as a battery mode control signal 610 (shown in FIGS. 2, 3, 4, and 6), to: 1) energize the relay connecting the boost converter output directly to the output terminals, 2) adjust the boost converter circuit to cause the boost converter to deliver a voltage equal to what the flyback converter would have delivered, and 3) disable the flyback converter.

Figure 2:
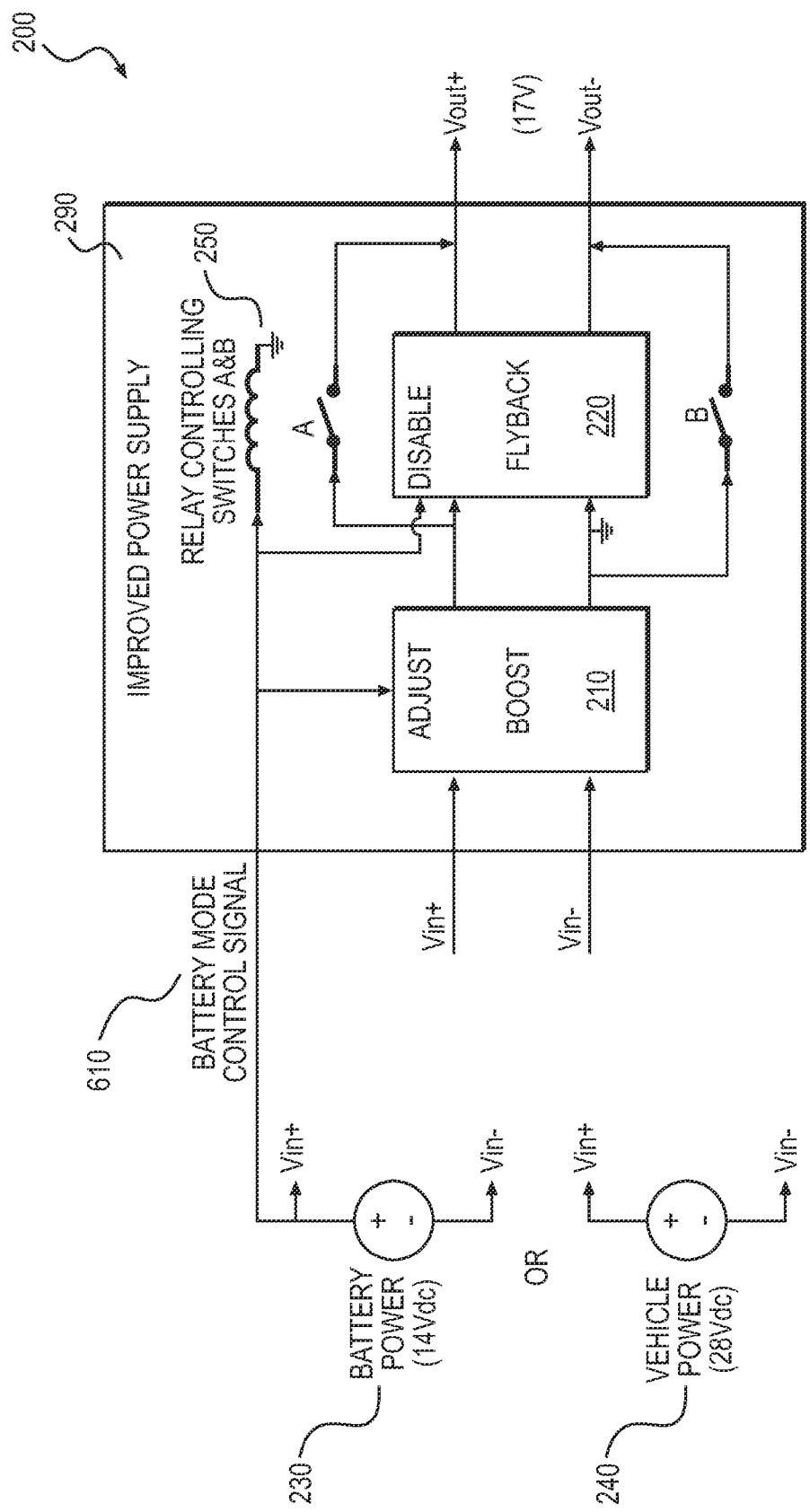
FIG. 2 illustrates an embodiment of a system for providing a high efficiency bypass circuit for multi-stage DC-DC converters used in battery powered systems.

Referring to FIG. 2, an embodiment of a power supply 290 includes a high efficiency bypass circuit for multi-stage DC-DC converters, such as a boost converter 210 and a flyback converter 220. When the system 200 is operating using battery power 230 (as opposed to vehicle power 240), the bypass circuit uses a small number of discrete devices including a relay 250 to bypass the inefficient stage of the flyback converter 220. In other words, the high efficiency bypass circuit provides output power directly from the boost converter 210. This bypass circuit improves the efficiency of the power supply 290 by approximately 15% (compared with the conventional power supply 190 of FIG. 1) to a total of approximately 90%. Consequently, the battery life is improved, which is always important in the battery powered systems.

With continued reference to FIG. 2, the power supply 290 connects the battery power 230 to an additional input connector pin to provide the single control signal, i.e., battery mode control signal 610. The battery mode control signal 610 may be an extra unused pin in the power supply circuitry. The single control signal adjusts the boost converter's output voltage to a desired value, such as 17V. The single control signal also controls switches A & B to disable the flyback converter 220, as shown in FIG. 2. The battery mode control signal 610 is on only when the system 200 is operating in the battery mode, e.g., when a Zinc-Air Battery is installed. In the vehicle mode the battery mode control signal 610 is off.

Figure 3:
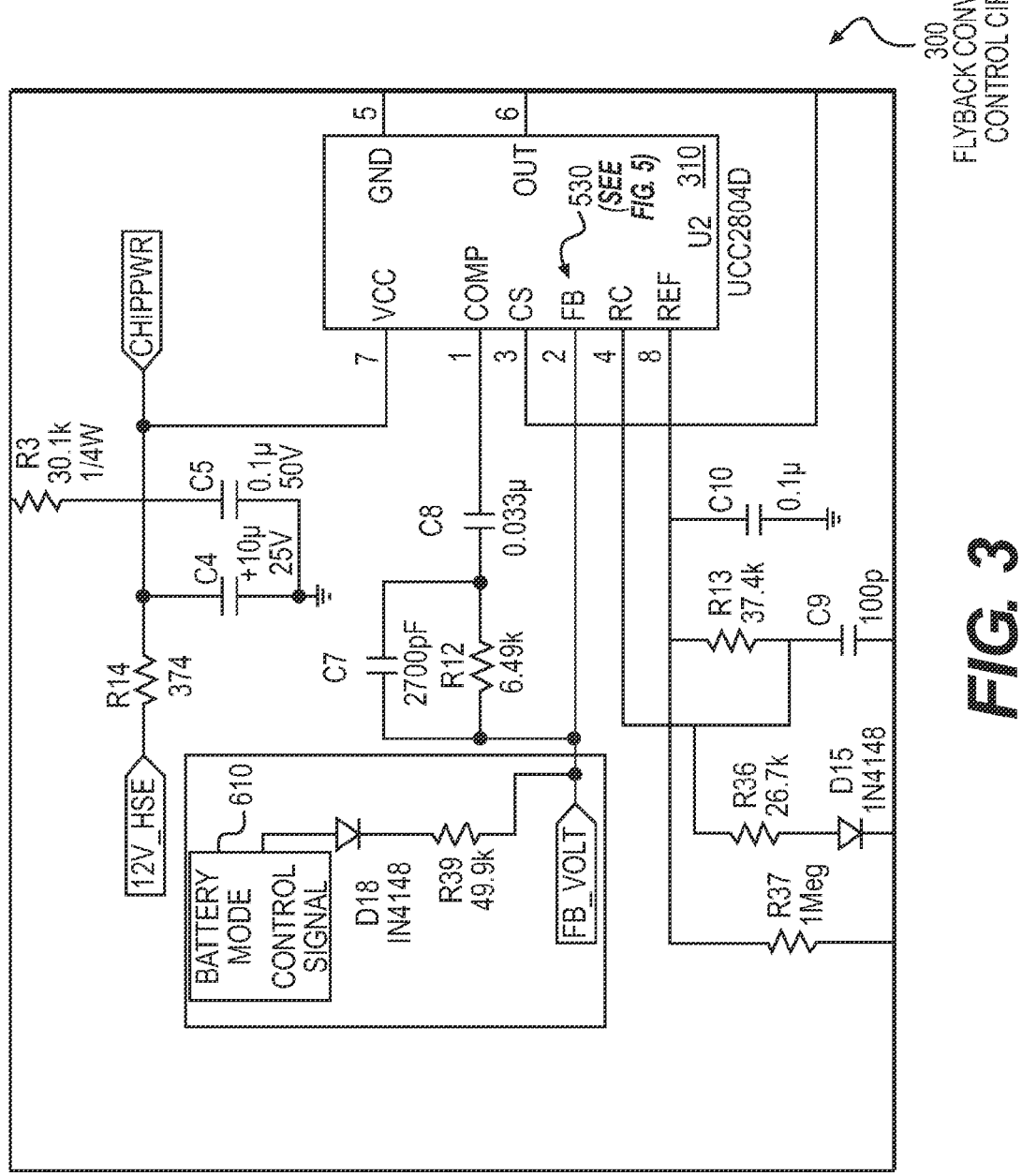
FIG. 3 illustrates an embodiment of a flyback converter control circuit that uses a single control signal, referred to as a battery mode control signal, to force the flyback converter to stop operating, produce no output voltage, and dissipate no internal power.

FIG. 3 illustrates an embodiment of a flyback converter control circuit 300 that uses the single control signal, i.e., the battery mode control signal 610, to force the flyback converter 220 to stop operating, produce no output voltage, and dissipate no internal power. Specifically, resistor $R_{39}$ and diode $D_{18}$ are used to pull the voltage on a feedback pin (FB) 530 (also shown in FIG. 5) of a flyback converter control chip 310 (shown as U2) above its internal threshold, thus causing the flyback converter 220 (which is connected to the output pin 6 of the flyback converter control chip 310) to cease to run.

Figure 4:
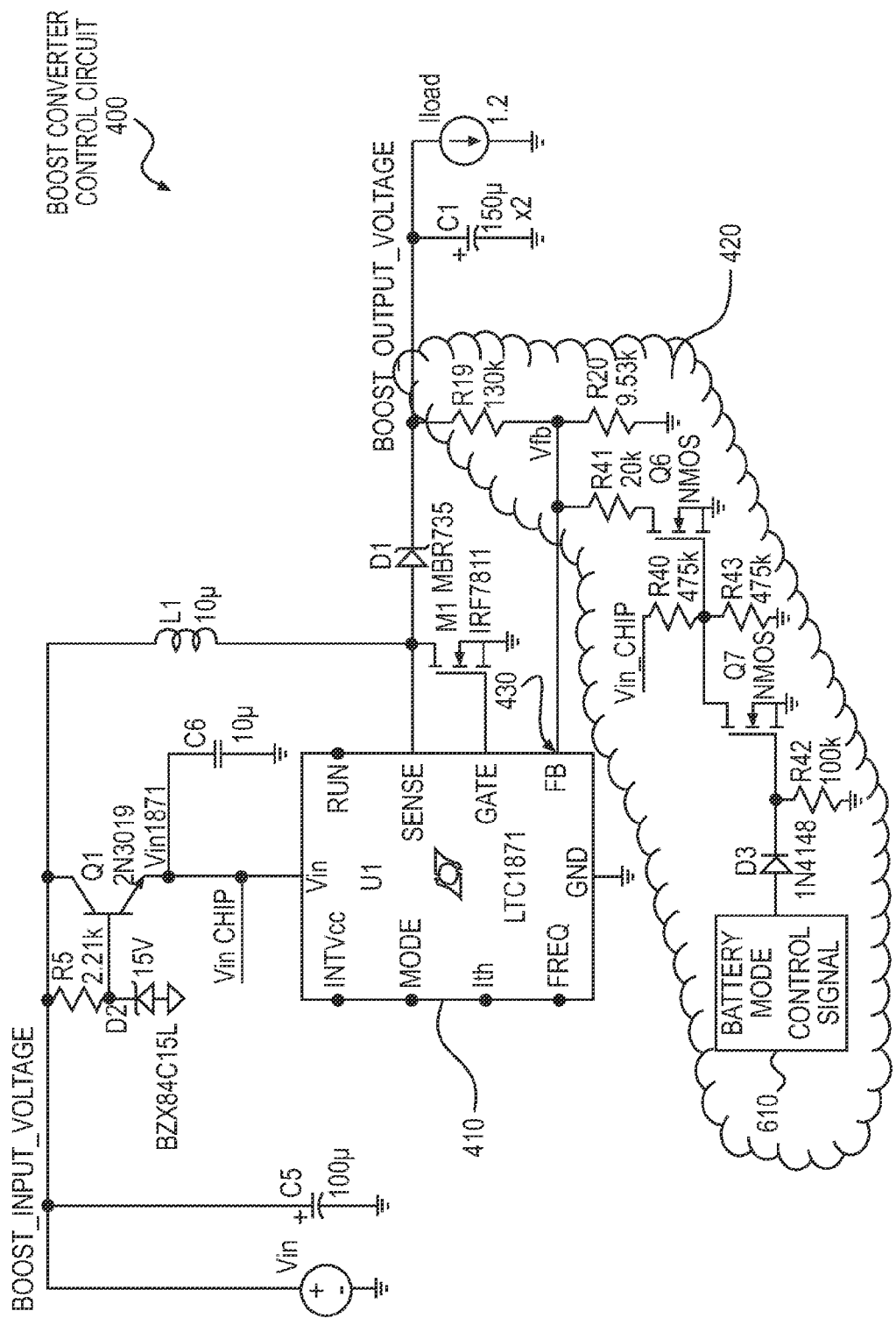
FIG. 4 illustrates an embodiment of a boost converter control circuit that includes a control chip and a circuit that determines the boost converter output voltage level.

FIG. 4 illustrates an embodiment of a boost converter control circuit 400 that includes a boost converter control chip 410 (e.g., LTC 1871 chip) and a circuit 420 that determines the boost converter output voltage level. The circuit 420 turns off $Q_6$ and leaves $R_{19}$ and $R_{20}$ connected as the feedback divider so that the boost converter's output is set to the desired lower voltage, such as 17V, which is what the system output needs to be and what the flyback converter 220 was originally providing.

Figure 5:
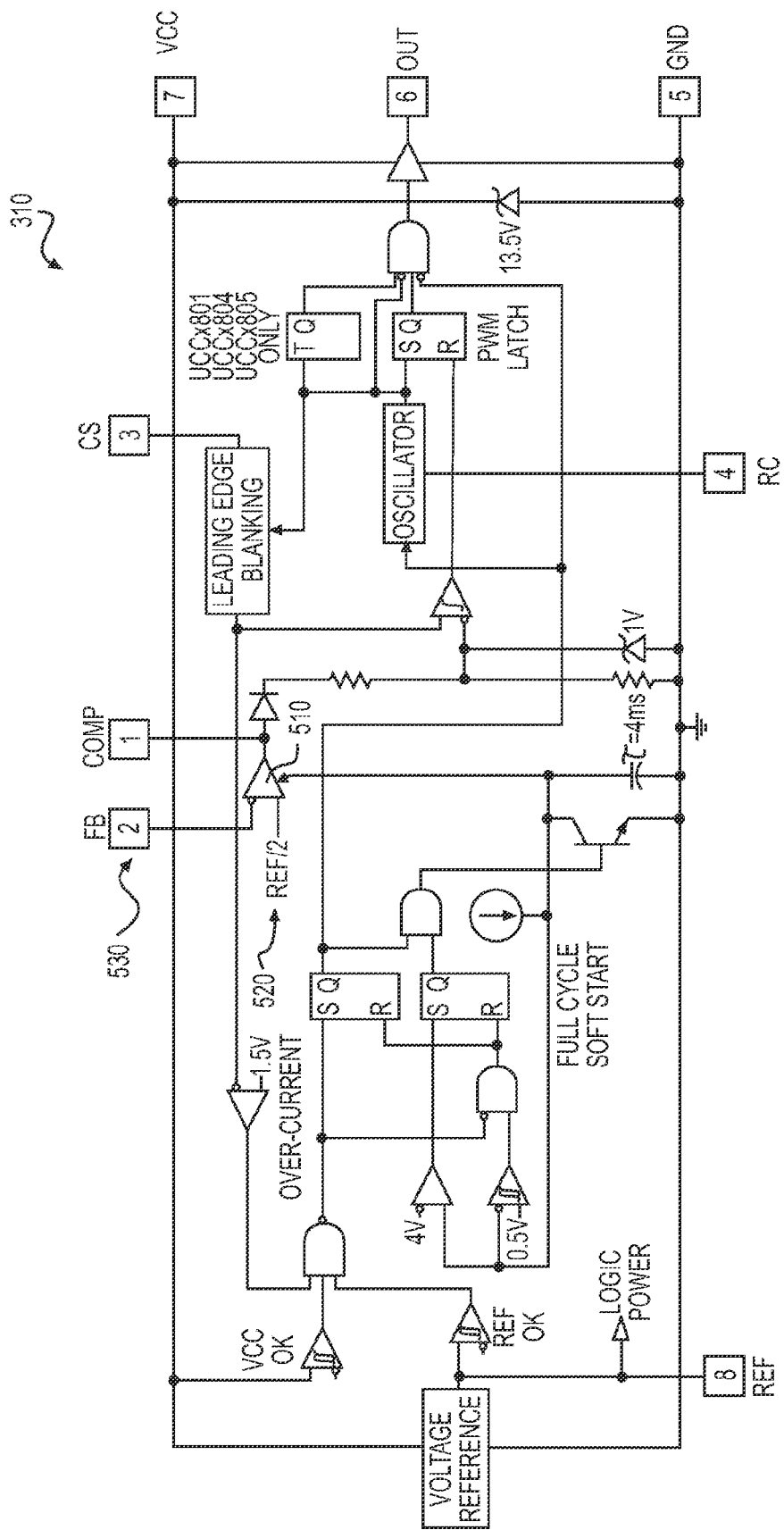
FIG. 5 illustrates an embodiment of the feedback pin of FIG. 3 that feeds an error amplifier in the flyback converter control chip of FIG. 3.

FIG. 5 illustrates an embodiment of the feedback pin 530 that feeds an error amplifier 510, i.e., comparator, in the flyback converter control chip 310 (also shown as U2 in FIG. 3). The error amplifier 510 compares the voltages of the flyback converter control chip's internal reference point 520 (shown as REF/2 in FIG. 5) and the voltage at the feedback pin 530 connected to the output of the flyback converter 220. The internal reference point 520 has a voltage of, for example, 2.5V. If the voltage of the feedback pin 530 $V_{FB}$ is less than the reference point 520, the controls within the flyback converter control chip 310 attempts to make the output voltage of the flyback converter 220 larger. If the voltage of the resistor divider 530 $V_{FB}$ is greater than the reference point 520, the flyback converter control chip 310_attempts to make the output voltage of the flyback converter 220 smaller.

Referring back to FIG. 4, during original operation, the battery mode control signal is low, so $Q_7$ is off (i.e., looks like an open circuit). The Gate to $Q_6$ is held high by the resistor divider at $R_{40}$, $R_{43}$ so $Q_6$ mosfet is on (i.e., looks like a short). When $Q_6$ is on, $R_{41}$ and $R_{20}$ are in parallel, and together look like a resistance of $R_{parallel}=R_{20}*R_{41}/(R_{20}+R_{41})=6.54$ k. The voltage at $V_{FB}$ of the boost converter control chip 410 is created by a resistor divider $R_{19}$ and $R_{parallel}$ and the output voltage of the boost converter 210 using the following equation:

$$V_{FB}=V_{output}*R_{parallel}/(R_{parallel}+R_{19}).$$

$V_{FB}$ is compared to, for example. a 1.23V reference voltage inside the boost converter control chip 410, (e.g., LT1871 chip) at a feedback (FB) pin 430. At steady state, this means that the output voltage is set to 25.68V, for example.

With continued reference to FIG. 4, during bypass operation, the battery mode control signal 610 is high, so $Q_7$ is on and holds the gate of $Q_6$ at ground. $Q_6$ mosfet is therefore off (i.e., it is an open circuit with infinite resistance). So $R_{41}$ is not in parallel with $R_{20}$. The voltage at the FB pin, $V_{FB}$, is created by a resistor divider $R_{19}$ and $R_{20}$ and the output voltage of the boost converter 210 using the following equation:

$V_{FB}=V_{output}*R_{20}/(R_{20}+R_{19})$. At steady state, this means that the output voltage is set to 18V, for example.

Figure 6:
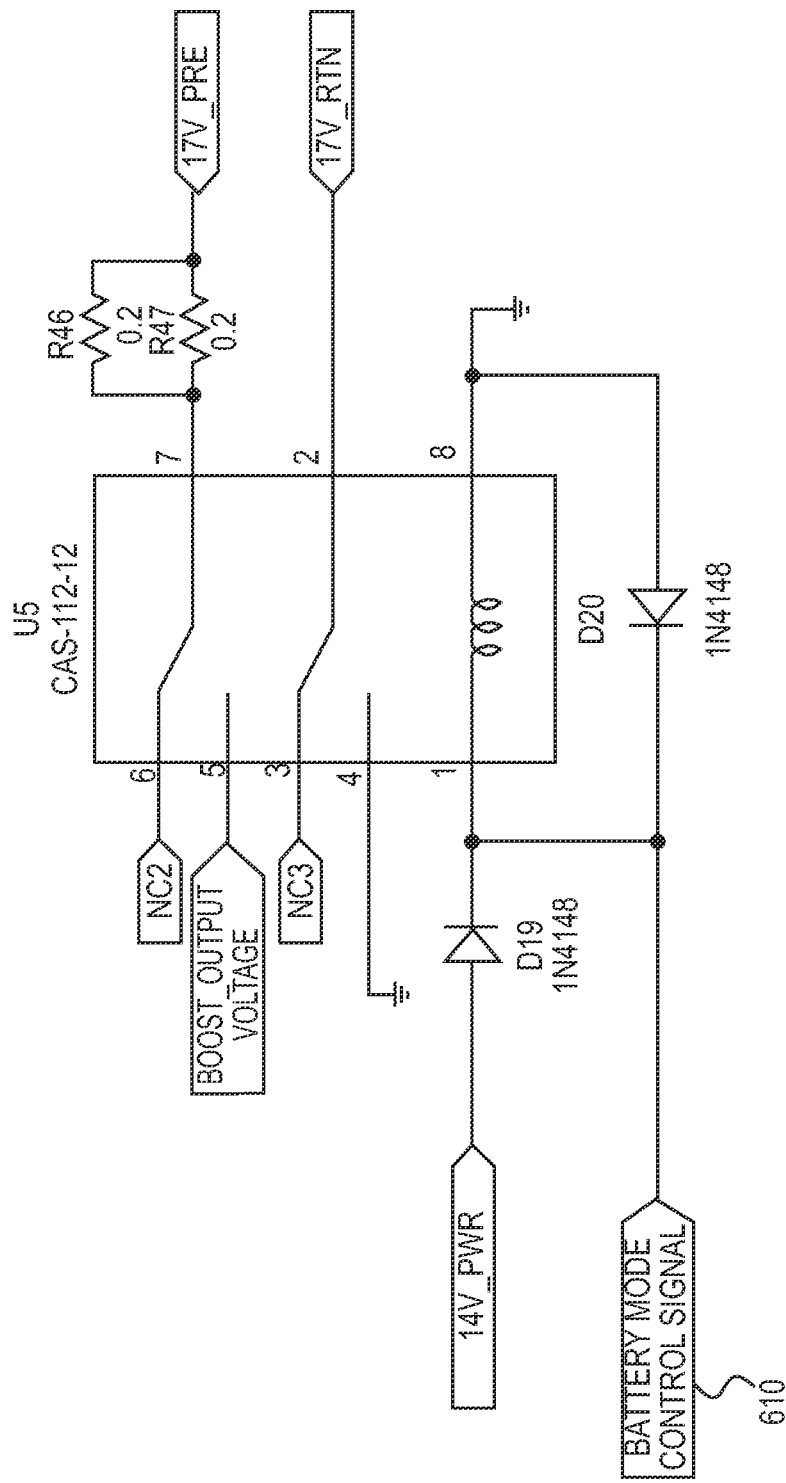
FIG. 6 illustrates that the single control signal, i.e., battery mode control signal, is also used to energize a relay to route the output of the boost converter to the output connector, thus bypassing the flyback converter.

FIG. 6 illustrates that the single control signal, i.e., the battery mode control signal 610, is also used to energize the relay 250 to route the output of the boost converter 210 to the output connector, thus bypassing the flyback converter 220. The pin labeled 14V_PWR is connected to the battery positive terminal via a power connector. Diode $D_{19}$ is incorporated into the circuit to prohibit any fault current from flowing back into the battery. A Zinc-Air battery is prone to severe damage if subjected to small reverse currents. $D_{19}$ protects the battery from any possible faults that may occur within the power converter. $D_{20}$ is an energy absorbing device typically placed around relay coils to re-circulate coil current upon removal of 14V_PWR. The battery mode control signal 610 is derived as the voltage at the junction of $D_{19}$ and $D_{20}$ at pin 1 of the relay.

The battery mode control signal 610 is delivered to diode $D_3$ in FIG. 4 where it causes the boost voltage to shift downward to 17V. The battery mode control signal 610 is also delivered to diode $D_{18}$ in FIG. 3 where it adds to and essentially overrides the feedback signal into the error amplifier 510, causing the flyback converter 220 to cease operating, as described above.

Figure 7:
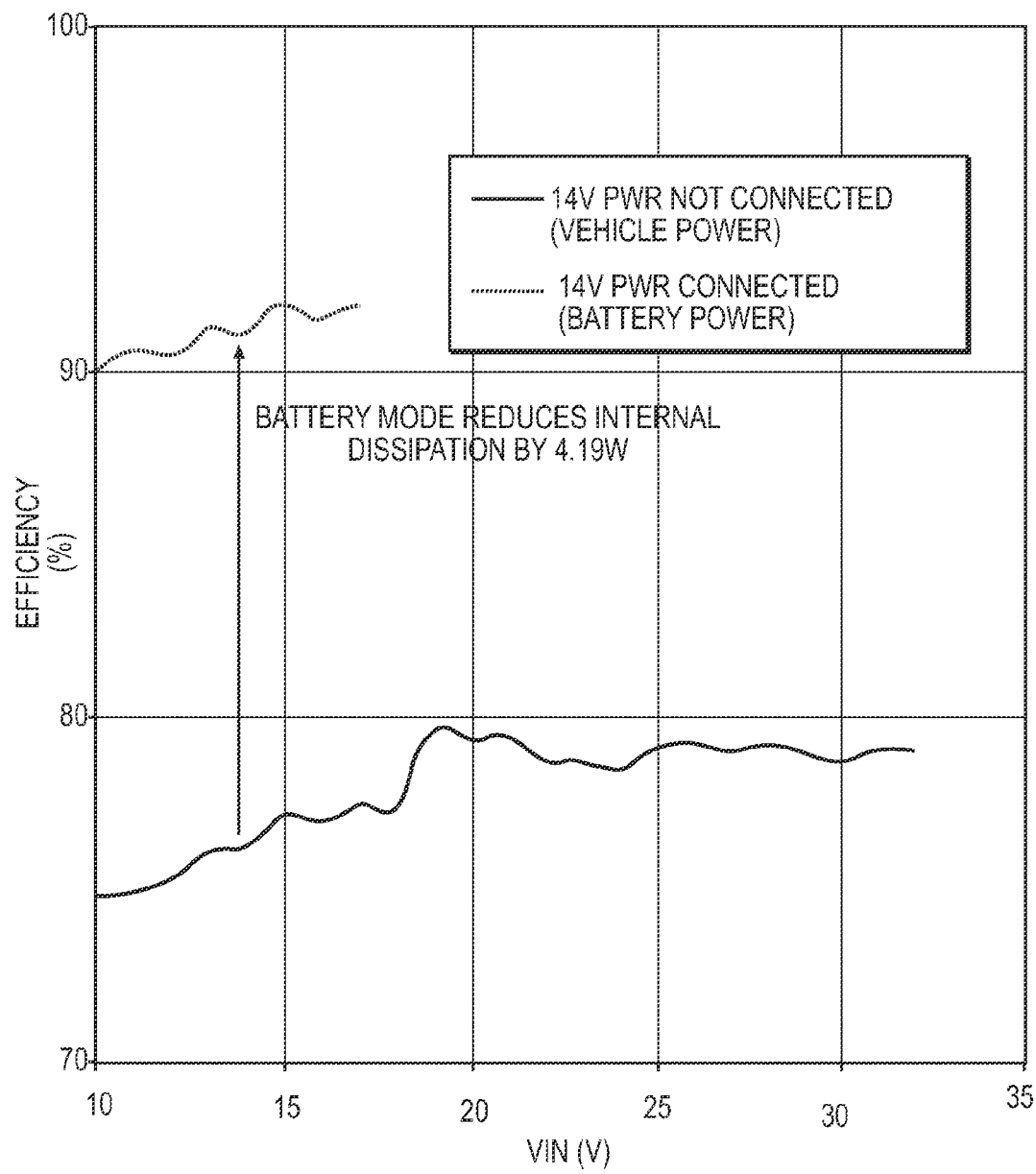
FIG. 7 illustrates an exemplary efficiency improvement chart using the high efficiency bypass circuit for multi-stage DC-DC converters.

FIG. 7 illustrates an exemplary efficiency improvement chart using the high efficiency bypass circuit for multi-stage DC-DC converters. For example, the efficiency in the high efficiency bypass battery mode may be raised from the 75% to 78% in the original design to 91% to 95%. This efficiency improvement results in a reduction of current drawn from the battery, thus extending the life of the battery.

For example, for a BA8180 battery power supply, the efficiency improvement is as follows. The battery power supply's specifications are 12V at 56 Amp-hours. At 12V in the normal mode, the power supply may need an input current of 1.82 A (taken from measured data). In the high efficiency battery mode, the power supply may need an input current of 1.50 A.

$$\frac{56\ A*h}{1.5\ A} - \frac{56\ A*h}{1.82\ A} = 37.3\ h - 30.7\ h = 6.56\ h$$

extended battery life

This 6.56 hours is equivalent to a 21% increase in the active life of the battery charge.

Figure 8:
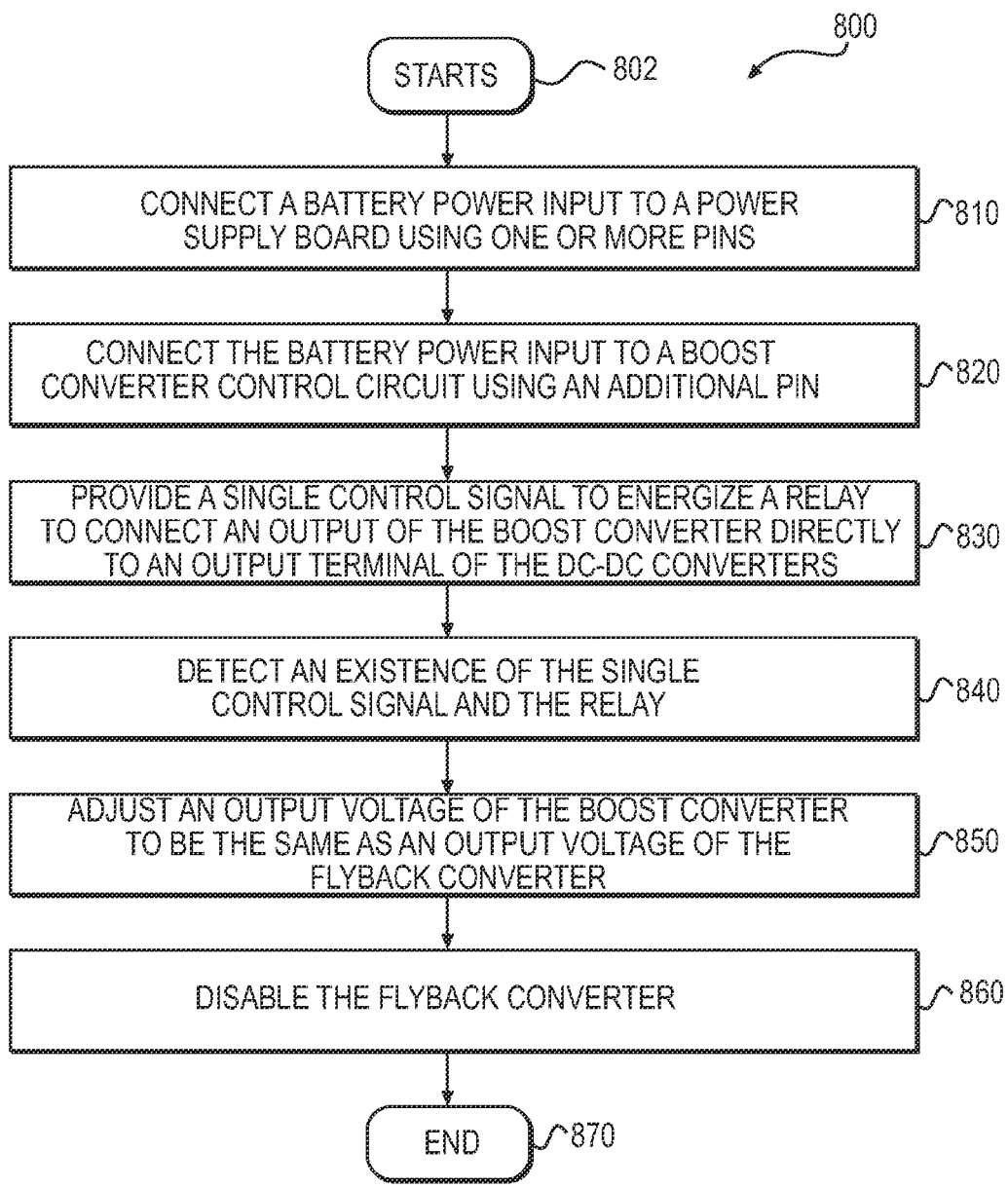
FIG. 8 is a flow chart illustrating an embodiment of a method for providing a high efficiency bypass circuit for multi-stage DC-DC converters used in battery powered systems.

FIG. 8 is a flow chart illustrating an embodiment of a method 800 for providing a high efficiency bypass circuit for multi-stage DC-DC converters used in battery powered systems. The method 800 starts 802 by connecting a battery power input to a power supply board using one or more pins (block 810), and connecting the battery power input to a boost converter control circuit using an additional pin (block 820). The boost converter control circuit provides a single control signal to energize a relay to connect an output of the boost converter directly to an output terminal of the DC-DC converters (block 830). After detecting the existence of the control line with the relay (block 840), the method 800 adjusts an output voltage of the boost converter to be the same as an output voltage of the flyback converter (block 850), and disables the flyback converter (block 860). The battery power input may be detected using a diode and may be used to energize a relay and to generate the battery mode control signal 610 to be used by the boost and flyback converters. The method 800 ends at 870.

The system and method for providing a high efficiency bypass circuit for multi-stage DC-DC converters may improve thermal performance (i.e., efficiency) by removing dissipation generated by the flyback converter, improve battery life, and improve noise performance, since the flyback converter adds its own switching ripple to the output.

The system and method for providing a high efficiency bypass circuit for multi-stage DC-DC converters may be applied to any item that utilizes a wide range of input power options, but also requires high efficiency to elongate battery life. The system and method may be applied to multiple industry standard battery powered applications where small footprint, small part count, and dual input mode supplies are needed. Examples are Ipods, MP3 players, Gameboys, Nintendo remote controls, electric razors, electric tooth brushes, cell phones, Blackberries, alarm clocks with external backup batteries that need to work when the power goes out, home security systems with battery back up, electric vehicle applications, and portable battery powered oscilloscopes.

Figure 9:
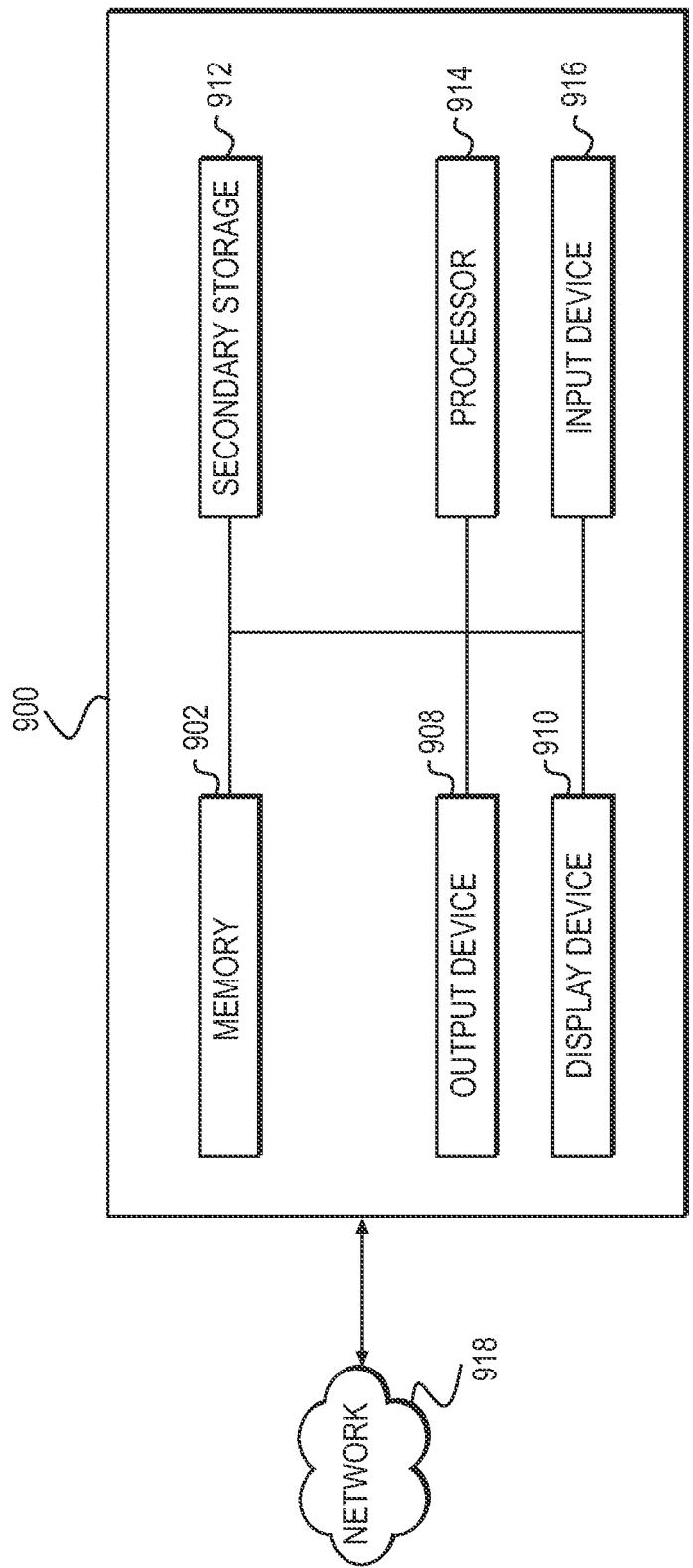
FIG. 9 illustrates exemplary hardware components of a computer that may be used in connection with the method for providing a high efficiency bypass circuit for multi-stage DC-DC converters used in battery powered systems.

FIG. 9 illustrates exemplary hardware components of a computer 900 that may be used in connection with the method 800 for providing a high efficiency bypass circuit for multi-stage DC-DC converters used in battery powered systems. The computer 900 includes a connection with a network 918 such as the Internet or other type of computer network. The computer 900 typically includes a memory 902, a secondary storage device 912, a processor 914, an input device 916, a display device 910, and an output device 908.

The memory 902 may include random access memory (RAM) or similar types of memory. The secondary storage device 912 may include a hard disk drive, floppy disk drive, CD-ROM drive, or other types of non-volatile data storage, and may correspond with various databases or other resources. The processor 914 may execute information stored in the memory 902, the secondary storage 912, or received from the Internet or other network 918. The input device 916 may include any device for entering data into the computer 900, such as a keyboard, keypad, cursor-control device, touch-screen (possibly with a stylus), or microphone. The display device 910 may include any type of device for presenting a visual image, such as, for example, a computer monitor, flat-screen display, or display panel. The output device 908 may include any type of device for presenting data in hard copy format, such as a printer, or other types of output devices including speakers or any device for providing data in audio form. The computer 900 can possibly include multiple input devices, output devices, and display devices.

Although the computer 900 is shown with various components, one skilled in the art will appreciate that the computer 900 can contain additional or different components. In addition, although aspects of an implementation consistent with the method for providing a high efficiency bypass circuit for multi-stage DC-DC converters used in battery powered systems are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer 900 to perform a particular method.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for providing a high efficiency bypass circuit for multi-stage direct current to direct current (DC-DC) converters, the DC-DC converters including a boost converter and a flyback converter, the system comprising:
a control circuit comprising a relay that connects an output of the boost converter directly to an output terminal of the DC-DC converters,
wherein the control circuit provides a single control signal to adjust an output voltage of the boost converter to be the same as an output voltage of the flyback converter and to disable the flyback converter.

2. The system of claim 1, wherein the system uses one or more pins to connect a battery power input to a power supply board, and wherein the control circuit is connected to the battery power input using an additional pin.

3. The system of claim 2, wherein the system operates in a battery mode and a vehicle mode, and wherein the additional pin is energized only when the system is operating in the battery mode.

4. The system of claim 3, wherein the additional pin is not connected when the system is operating in the vehicle mode.

5. The system of claim 1, wherein the control circuit further comprises a control chip and an error amplifier that compares voltages of the control chip's internal reference point and a resistor divider, and adjusts the output voltage of the boost converter accordingly.

6. The system of claim 5, wherein the control circuit uses a resistor and a diode to inject an override current into the error amplifier, causing the flyback converter to cease to run.

7. The system of claim 1, wherein an efficiency of the DC-DC converters is increased by about 20% to a total of about 90%.

8. The system of claim 1, wherein the output voltage of the boost converter is 17V.

9. A method for providing a high efficiency bypass circuit for multi-stage direct current to direct current (DC-DC) converters, the DC-DC converters including a boost converter and a flyback converter, comprising:
connecting a battery power input to a power supply board using one or more pins;
connecting the battery power input to a boost converter control circuit using an additional pin;
providing a single control signal to energize a relay to connect an output of the boost converter directly to an output terminal of the DC-DC converters;
detecting an existence of the single control signal and the relay;
adjusting an output voltage of the boost converter to be the same as an output voltage of the flyback converter; and
disabling the flyback converter.

10. The method of claim 9, wherein the high efficiency bypass circuit operates in a battery mode and a vehicle mode, and wherein the additional pin is energized only when the high efficiency bypass circuit is operating in the battery mode.

11. The method of claim 9, wherein the additional pin is not connected when the high efficiency bypass circuit is operating in the vehicle mode.

12. The method of claim 9, further comprising:
comparing voltages of a control chip's internal reference point and a resistor divider, and
adjusting the output voltage of the boost converter accordingly.

13. The method of claim 9, further comprising using a resistor and a diode to inject an override current into an error amplifier, causing the flyback converter to cease to run.

14. The method of claim 9, wherein an efficiency of the DC-DC converters is increased by about 20% to a total of about 90%.

15. The method of claim 9, wherein the output voltage of the boost converter is 17V.

16. A computer readable medium providing instructions for providing a high efficiency bypass circuit for multi-stage direct current to direct current (DC-DC) converters, the DC-DC converters including a boost converter and a flyback converter, the instructions comprising:
connecting a battery power input to a power supply board using one or more pins;
connecting the battery power input to a boost converter control circuit using an additional pin;
providing a single control signal to energize a relay to connect an output of the boost converter directly to an output terminal of the DC-DC converters;
detecting an existence of the single control signal and the relay;
adjusting an output voltage of the boost converter to be the same as an output voltage of the flyback converter; and
disabling the flyback converter.

17. The computer readable medium of claim 16, wherein the high efficiency bypass circuit operates in a battery mode and a vehicle mode, and wherein the additional pin is energized only when the high efficiency bypass circuit is operating in the battery mode.

18. The computer readable medium of claim 16, wherein the additional pin is not connected when the high efficiency bypass circuit is operating in the vehicle mode.

19. The computer readable medium of claim 16, further comprising instructions for:
comparing voltages of a control chip's internal reference point and a resistor divider, and
adjusting the output voltage of the boost converter accordingly.

20. The computer readable medium of claim 16, further comprising instructions for using a resistor and a diode to inject an override current into an error amplifier, causing the flyback converter to cease to run.

* * * * *